W. J. KENNEY.
STOKER CONSTRUCTION.
APPLICATION FILED MAY 24, 1913.
1,162,785.
Patented Dec. 7, 1915.
3 SHEETS—SHEET 1.
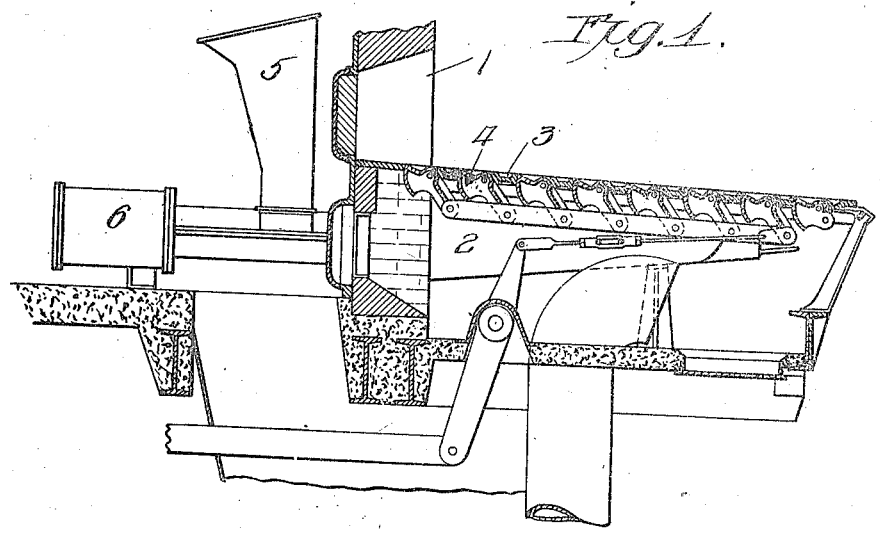
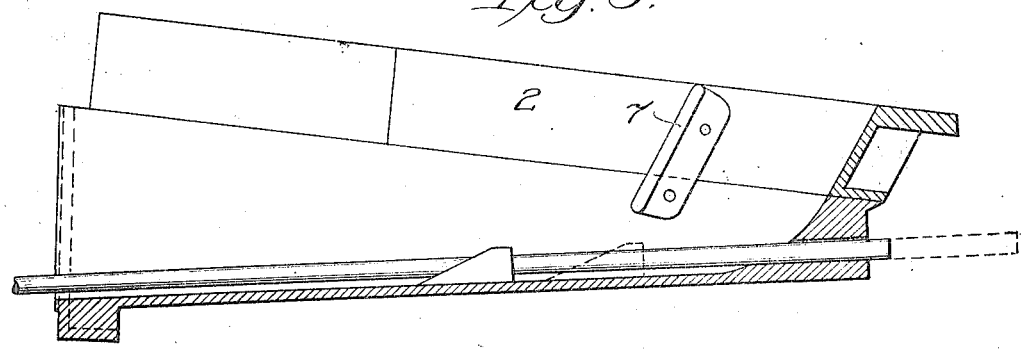
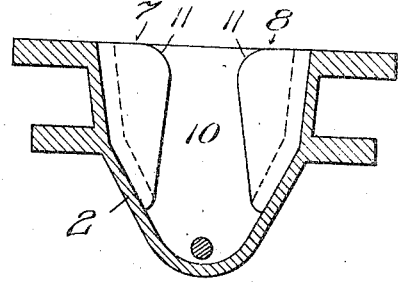

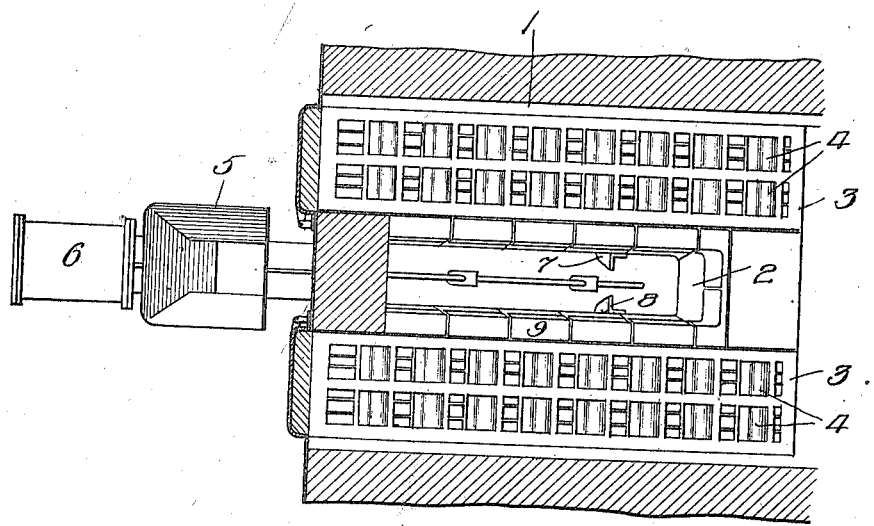
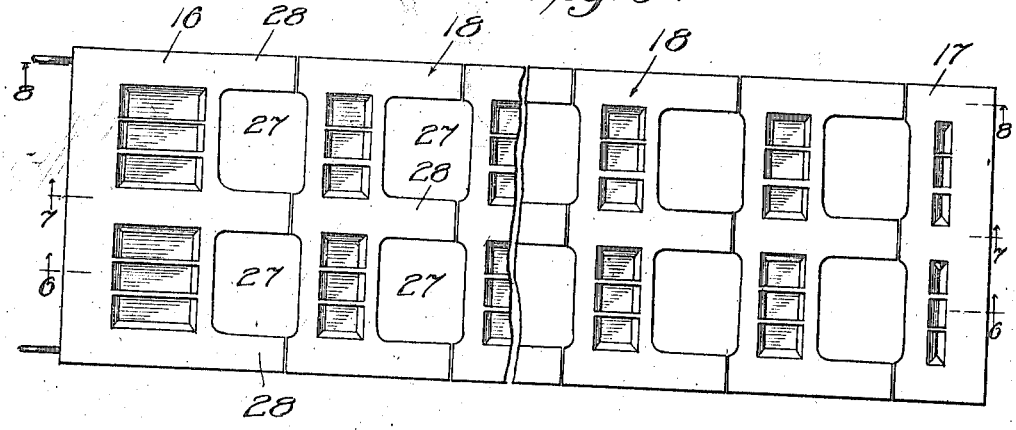

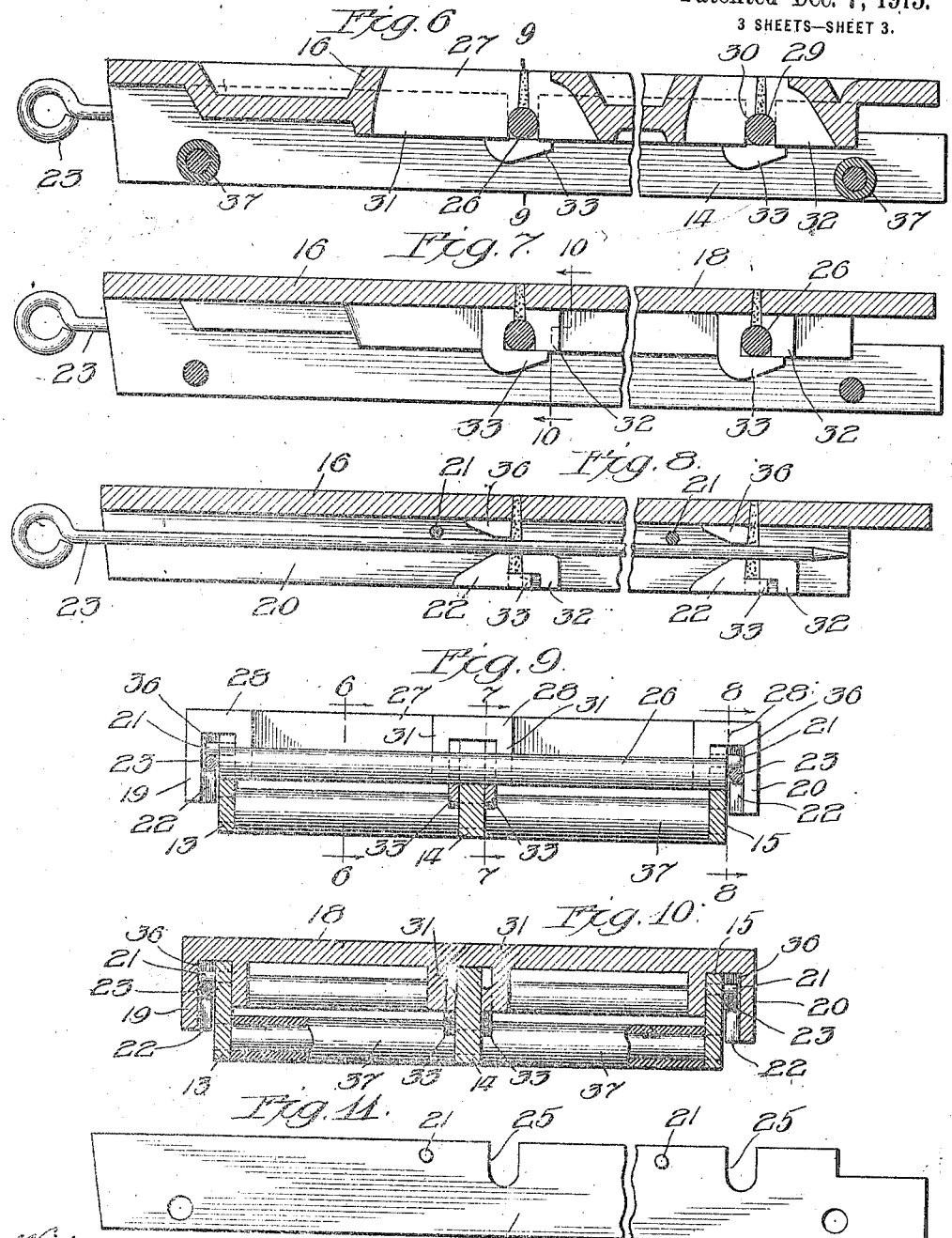

UNITED STATES PATENT OFFICE.

WILLIAM JOHN KENNEY, OF WILMETTE, ILLINOIS, ASSIGNOR TO UNDER-FEED STOKER COMPANY OF AMERICA, OF CHICAGO, ILLINOIS, A CORPORATION OF NEW JERSEY.

STOKER CONSTRUCTION.

1,162,785.   Specification of Letters Patent.   Patented Dec. 7, 1915.

Application filed May 24, 1913. Serial No. 769,564.

*To all whom it may concern:*

Be it known that I, WILLIAM J. KENNEY, a citizen of the United States, residing at Wilmette, county of Cook, State of Illinois, have invented a certain new and useful Improvement in Stoker Construction, and declare the following to be a full, clear, and exact description of the same, such as will enable others skilled in the art to which it pertains to make and use the same, reference being had to the accompanying drawings, which form a part of this specification.

Generally speaking, my invention has for its object to simplify and improve the construction of under-feed stokers.

Viewed in one of its aspects, my invention may be said to have for its object to provide means for securing a more perfect distribution of the fuel in under-feed stokers than has heretofore been possible.

Viewed in another of its aspects, my invention may be said to have for its object to produce a simple and novel dead plate construction for use in under-feed stokers, whereby the assembling of the stoker will be made simple and easy and the renewal of worn parts may be effected in a simple and convenient manner without involving a waste of parts which are still useful.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a vertical longitudinal section through a portion of a furnace containing a stoker arranged in accordance with a preferred form of my invention; Fig. 2 is a top plan view of the structure shown in Fig. 1; Fig. 3 is a central vertical longitudinal section, on an enlarged scale, through the retort shown in Figs. 1 and 2; Fig. 4 is a view looking toward the right from the left hand end of Fig. 3; Fig. 5 is a top plan view, on an enlarged scale, of one of the dead plates, a section between the ends being broken away; Fig. 6 is a longitudinal section on an enlarged scale taken approximately on line 6—6 of Fig. 5 or on line 6—6 of Fig. 9, the major portion of the dead plate between the ends thereof being broken away; Fig. 7 is a view similar to Fig. 6 taken approximately on line 7—7 of Fig. 5 or line 7—7 of Fig. 9; Fig. 8 is a view similar to Figs. 6 and 7 taken approximately on line 8—8 of Fig. 5 or line 8—8 of Fig. 9; Fig. 9 is a section taken on line 9—9 of Fig. 6; Fig. 10 is a section taken approximately on line 10—10 of Fig. 7; and Fig. 11 is a side view of one of the supporting bars of the dead plate, the middle part being broken away.

Referring to the drawings, 1 represents a furnace having therein the retort, 2, of an under-feed stoker. Between each side of the furnace and the retort is located a dead plate, 3, in which are mounted movable dogs, 4, which, through their movement, break the clinkers and ashes from the edges of the retort and feed them rearwardly. The retort is of the type open at the front end and at the top, the fuel being fed into the front end from a hopper, 5, by means of a suitable power-actuated ram, 6.

All of the parts heretofore described are, in a general way, of old and well known construction, the present invention consisting of improvements which I shall now describe and to which the more detailed description will be confined.

In stokers of the type illustrated, the fuel enters the front end of the retort and moves rearwardly until the lower portion of the retort is full. When the fuel reaches the rear end of the retort its progress in the longitudinal direction is arrested and the incoming fuel therefore causes that already in the retort to rise up through the combustion zone at the top of the retort and finally to well over the sides of the retort upon the dead plates. I have found that a better distribution of the fuel may be obtained by so constructing the retort that the upward movement of the fuel is not left wholly under the control of the resistance offered by the rear end of the retort and the resistance between the individual pieces of the mass of fuel in the retort; for, if the resistance to upward movement along the rear end of the retort be slight, it may be that an excess of fuel will travel to the rear end of the retort before rising. Any tendency of the fuel to pile up toward the rear may be overcome or, viewed in another aspect, the amount of fuel which will travel to the rear end of the retort before rising may be reduced by providing in the retort between the end thereof suitable deflectors which will extend across the path of a portion or portions of the rearwardly-moving mass and change the course of such portion or portions so as to make it or them rise to the top of the retort at some intermediate point or points. In the arrangement shown there is a single rearwardly-inclined partition arranged transversely of the retort at some distance in advance of the rear end, the central portion of the partition being removed from the top to the bottom so as to produce, in effect, two wings, 7 and 8, extending toward each other from opposite sides of the retort, but having their inner edges separated so as to provide a clear passage back through the center of the retort. With this arrangement, the central body of the rearwardly-moving fuel in the retort is free to travel to the rear end past the partition; thus supplying the rear end of the retort with sufficient fuel to take care of the need in this vicinity; while those portions of the rearwardly-moving mass located at the sides of the retort are arrested by the inclined partition and caused to rise up over the top of the retort in just the same way as though the rear end of the retort ended at the partition. The partition preferably extends from a plane somewhat above the bottom of the retort to a plane near the top of the retort and below the twyer blocks, 9. Thus the partition is made high enough to bring the deflected fuel into the combustion zone without itself having parts extending into a hot zone where they would soon be burned away. The opening, 10, in the partition may take various forms but I prefer to make it somewhat wider at the bottom than at the top and to round the upper inner corners of the wings as indicated at 11.

Heretofore the stationary parts of the dead plates at the sides of the retorts have been made in the form of single members extending the entire length of the retort. With this old arrangement, an injury to one portion of a dead plate makes it necessary to throw away the entire dead plate and replace it with a new one, although perhaps almost the entire plate may be in good condition. This makes the process of renewing dead plates wasteful of material and also of the workingman's time, since considerable time may be required to take out a dead plate, remove the cleaning dogs therefrom, place the dogs in a new dead plate and then assemble the new dead plate in the furnace. In the same way, where it has been desired to replace a single dog an entire dead plate has often to be disturbed. In accordance with my invention I have so arranged the dead plate structure that any worn part may be removed without wasting or even disturbing the remainder and any dog may be removed or replaced quickly and conveniently without disturbing any considerable part of the stationary structure. In order to obtain the above results, I make each dead plate of a series of individual units which are laid upon supporting bars and locked thereto in a simple manner; the bearings for the dogs being arranged between the dead plate units and the supporting bars so that the dogs are held in place by the dead plate units and any dog may readily be removed after the adjacent dead plate unit is lifted out of the way. In the arrangement shown, there are in the furnace at each side of the retort three parallel bars, 13, 14 and 15 extending longitudinally of the retort; one of the bars lying next to the retort, the second bar at the side of the furnace, and the third bar midway between the other two. Each dead plate is made of a number of short units, each long enough to extend across all three of the bars. The end units of the dead plates are indicated at 16 and 17, respectively, while the intermediate units, which will usually all be alike are indicated at 18. Each unit has flanges, 19 and 20, at its ends, the flanges being far enough apart to leave a space between the inner side of each flange and the corresponding supporting bar. Distributed along the outer faces of the two outside bars 13 and 15, are a series of lateral projections or pins, 21. On the inner sides of the flanges 19 and 20 are inwardly extending projections, 22, lying in a plane below the pins or projections 21. When the units of the dead plates are assembled upon the supporting bars, two long rods, 23, are slipped inside of the flanges 19 and 20 and between the projections 21 and 22, each rod extending the entire length of the dead plate. When the rods 23 are in position they engage with the upper sides of the projections 22 on the dead plates and with the under sides of the projections 21 on the bars and therefore serve positively to lock the dead plate units down upon the supporting bars.

In the upper edges of the supporting bars are open seats or bearings, 25, spaced apart to conform to the spacing between the dogs which serve to move the clinkers and ashes backward along the dead plates. The dead plate units are provided with recesses or bearings in their under sides in positions to register with the recesses or bearing in the bars, so that when the dead plate units are assembled on the bars they form with the latter closed bearing seats for the journals 26 of the dogs. For the sake of clearness the dogs have been omitted from Figs. 6 to 10 and the journals therefor have been represented as taking the form of shafts. In the arrangement shown the dogs in each dead plate are arranged in two longitudinal rows so that each dead plate is provided with two openings, 27, in which the dogs are adapted to lie. This arrangement leaves narrow longitudinal pieces, 28, at the sides of and between the two openings and, in order that the upward stresses on the dead plates due to the operation of the dogs will not be borne wholly by the narrow pieces beside and between the dogs, it is advisable so to shape the dead plates that the joints therein come at the ends of the pieces 28 and directly above the bearing seats 25 in the bars. This arrangement bring one-half, 29, of each of the top bearing seats at or very close to a portion of the dead plate which is continuous from one side of the dead plate to the other; the other half, 30, of each of the top bearing seats lying in the under sides of the free ends of the members 28. The members 28 lying at the sides of the dead plates are reinforced and stiffened by the flanges 19 and 20 while the central member may be stiffened by means of downwardly-extending flanges, 31, lying on opposite sides of the central supporting bar 14. Furthermore, each unit or section preferably has a part adapted to underlie the adjacent edge of the next unit or section. In the arrangement shown, each of the flanges 19, 20 and 31 has at one end a lug, 32, and at the opposite end a lug, 33; the lugs being so arranged that the lugs 33 on one unit underlie the lugs 32 on the other unit when the parts of the dead plate are assembled, so that each dead plate is held down at one end by the adjacent dead plate.

The lugs 32 on the flanges 19 and 20 may be so placed that they will engage with the under side of the rods 23 and, by placing at the opposite ends of these flanges lugs 36 adapted to overlie the rods 23, these rods will serve not only to hold the units of the dead plates upon the supporting bars, but also to lock the meeting ends of the dead plates together so that while the rods are in position the units of the dead plate are positively locked together as well as locked upon the supporting bars. In first setting up the apparatus the supporting bars are placed in position and, if desired, are held properly spaced by suitable spacers, 37. The journals of the dogs 4 are then laid into the open bearings, 25, in the upper edges of the bars. The units of the dead plates are then laid upon the bars, each opening, 27, in the dead plate units receiving one of the dogs and the parts 29 and 30 of the upper half of the bearing for each journal registering with the journal and with the corresponding seat, 25, completing the bearing for the journal. The rods 23 are then slipped in place and the assembling is complete. If one of the dead plate units becomes worn or it is desired for any other reason to remove it, all that it is necessary to do is to withdraw the rods 23 and then the unit is free to be lifted out. Upon replacing the unit or a new one and slipping the rods in place again the work is finished. In case one of the dogs is to be removed, the rods are withdrawn so that one or both of the dead plate units overlying the journals of the dog may be lifted, whereupon the dog is left free to be lifted out bodily.

It will thus be seen that I have provided a simple construction and arrangement which facilitates the assembling of the dead plate structure with its dogs, initially, and thereafter makes it an easy matter to remove any desired section of the dead plate or any one of the dogs, without disturbing the rest of the structure and without making it necessary to discard any more of the structure than should be discarded.

I claim:

1. A dead plate structure for a furnace comprising separated parallel supporting bars, a series of plates arranged in a row on said bars, lateral projections on the bars, projections on the plates arranged in a plane below the projections on the bars, and rods extending longitudinally of the bars and each engaging with the under sides of the projections on one of the bars and with the top sides of the corresponding projections on the plates.

2. A dead plate structure for a furnace comprising separated parallel supporting bars, a series of plates arranged in a row on said bars, lateral projections on the bars, projections on the plates arranged in a plane below the projections on the bars, and rods extending longitudinally of the bars and engaging with the under sides of the projections on the bars and with the top sides of the projections on the plates, each plate having at one edge a shoulder underlying the adjacent plate.

3. A dead plate structure for a furnace comprising separated parallel supporting bars, spacers between said bars for holding them in proper relation to each other, a series of plates arranged in a row on said bars, lateral projections on the bars, projections on the plates arranged in a plane below the projections on the bars, and rods extending longitudinally of the bars and each engaging with the under sides of the projections on one of the bars and with the top sides of the corresponding projections on the plates.

4. A dead plate structure for a furnace comprising parallel separated supporting bars, a series of individual plates arranged edge to edge in a row along said bars and having dog-receiving openings therethrough, means for detachably holding said plates on the bars, said bars having open seats in their upper edges, said plates having on their under sides open seats registering with the seats in the bars, transverse shafts lying in said seats, and dogs mounted on said shafts and lying within said openings.

5. In combination, a furnace, a retort in the furnace, separated parallel longitudinal supporting bars mounted at each side of the retort, a series of individual plates arranged in a row on the bars on each side of the retort and forming a continuous ash-supporting dead plate, said plates having dog-receiving openings therethrough, means for detachably locking said plates to the corresponding bars, dogs lying in the aforesaid openings in said plates, journals extending laterally from the dogs, and there being bearings for said journals arranged partly in the under side of the plates and partly in the tops of the bars.

6. In combination, a furnace, a retort in the furnace, separated parallel longitudinal supporting bars at each side of the retort, a series of individual plates arranged in a row on the bars on each side of the retort, said dead plates having dog-receiving openings, therethrough, means for detachably locking said plates to the corresponding bars, dogs lying in the aforesaid openings in said plates, journals extending laterally from the dogs, and there being bearings for said journals arranged partly in the under side of the plates and partly in the tops of the bars, the upper half of each bearing lying at the juncture of two of the plates and being located in part in each of the two plates.

In testimony whereof, I sign this specification in the presence of two witnesses.

WILLIAM JOHN KENNEY.

Witnesses:
MARGARET FALAHEE,
MATTIE D. STRETCH.